US012675589B2

(12) United States Patent
Talmor et al.

(10) Patent No.: US 12,675,589 B2
(45) Date of Patent: Jul. 7, 2026

(54) TIME-DELAY-BASED ACCESS CONTROL FOR CONTINUOUS INTEGRATION PIPELINES

(71) Applicant: Red Hat, Inc., Raleigh, NC (US)

(72) Inventors: Avraham Talmor, Ra'anana (IL); Arie Bregman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 355 days.

(21) Appl. No.: 18/158,145

(22) Filed: Jan. 23, 2023

(65) Prior Publication Data

US 2024/0249011 A1     Jul. 25, 2024

(51) Int. Cl.
*G06F 21/62* (2013.01)
*G06F 8/71* (2018.01)

(52) U.S. Cl.
CPC ............ *G06F 21/6218* (2013.01); *G06F 8/71* (2013.01); *G06F 2221/2141* (2013.01)

(58) Field of Classification Search
CPC . G06F 21/6218; G06F 8/71; G06F 2221/2141
See application file for complete search history.

(56) References Cited

U.S. PATENT DOCUMENTS

| | | | |
|---|---|---|---|
| 7,739,657 B2 | 6/2010 | Rolfs | |
| 7,809,597 B2 | 10/2010 | Das et al. | |
| 7,895,070 B2 | 2/2011 | Das et al. | |
| 8,191,044 B1 | 5/2012 | Berlik et al. | |
| 8,893,228 B2 | 11/2014 | Faitelson et al. | |
| 9,768,969 B2 | 9/2017 | Weinstein et al. | |

| | | | |
|---|---|---|---|
| 9,910,654 B1 * | 3/2018 | Brigham, II ........ | G06F 11/3692 |
| 9,934,016 B1 * | 4/2018 | Acosta .................... | G06F 11/36 |
| 10,454,938 B2 | 10/2019 | Anderson et al. | |
| 2003/0131313 A1 * | 7/2003 | Flanagan .................. | G06F 8/75 |
| | | | 715/210 |
| 2007/0288107 A1 * | 12/2007 | Fernandez-Ivern .......................... | |
| | | | G06Q 30/0201 |
| | | | 700/91 |
| 2019/0317754 A1 * | 10/2019 | Mosquera ........... | G06F 11/3495 |
| 2021/0019193 A1 * | 1/2021 | Ffrench ................. | G06F 9/5061 |

(Continued)

OTHER PUBLICATIONS

Anonymous, "Atlassian Bamboo—Bamboo Permissions: Using Bamboo," Aug. 25, 2021: pp. 1-6, <https://confluence.atlassian.com/bamboo/bamboo-permissions-369296034.html >.

*Primary Examiner* — Shewaye Gelagay
*Assistant Examiner* — Thomas A Carnes
(74) *Attorney, Agent, or Firm* — Kilpatrick Townsend & Stockton LLP

(57) ABSTRACT

A computing system can execute a continuous integration (CI) pipeline for merging a code commit into a software project. The CI pipeline can include CI phases that can output sets of result data. Each CI phase can generate a respective set of result data among the sets of result data. The computing system can determine delay times associated with the sets of result data, each respective set of result data being assigned a corresponding delay time among the delay times. For each respective delay time, the computing system can prevent a set of users from accessing the respective set of result data prior to an expiration of the corresponding delay time. The computing system can also permit the set of users to access the respective set of result data following the expiration of the corresponding delay time.

20 Claims, 3 Drawing Sheets

(56)                    References Cited

U.S. PATENT DOCUMENTS

| | | | |
|---|---|---|---|
| 2021/0103512 A1* | 4/2021 | Peterson | G06F 11/368 |
| 2022/0292177 A1* | 9/2022 | Asher | G06F 21/44 |
| 2022/0300265 A1* | 9/2022 | Purohit | G06F 11/3688 |
| 2023/0065530 A1* | 3/2023 | Mohanty | G06F 11/3608 |
| 2024/0095149 A1* | 3/2024 | Hegadi | G06F 11/3688 |

* cited by examiner

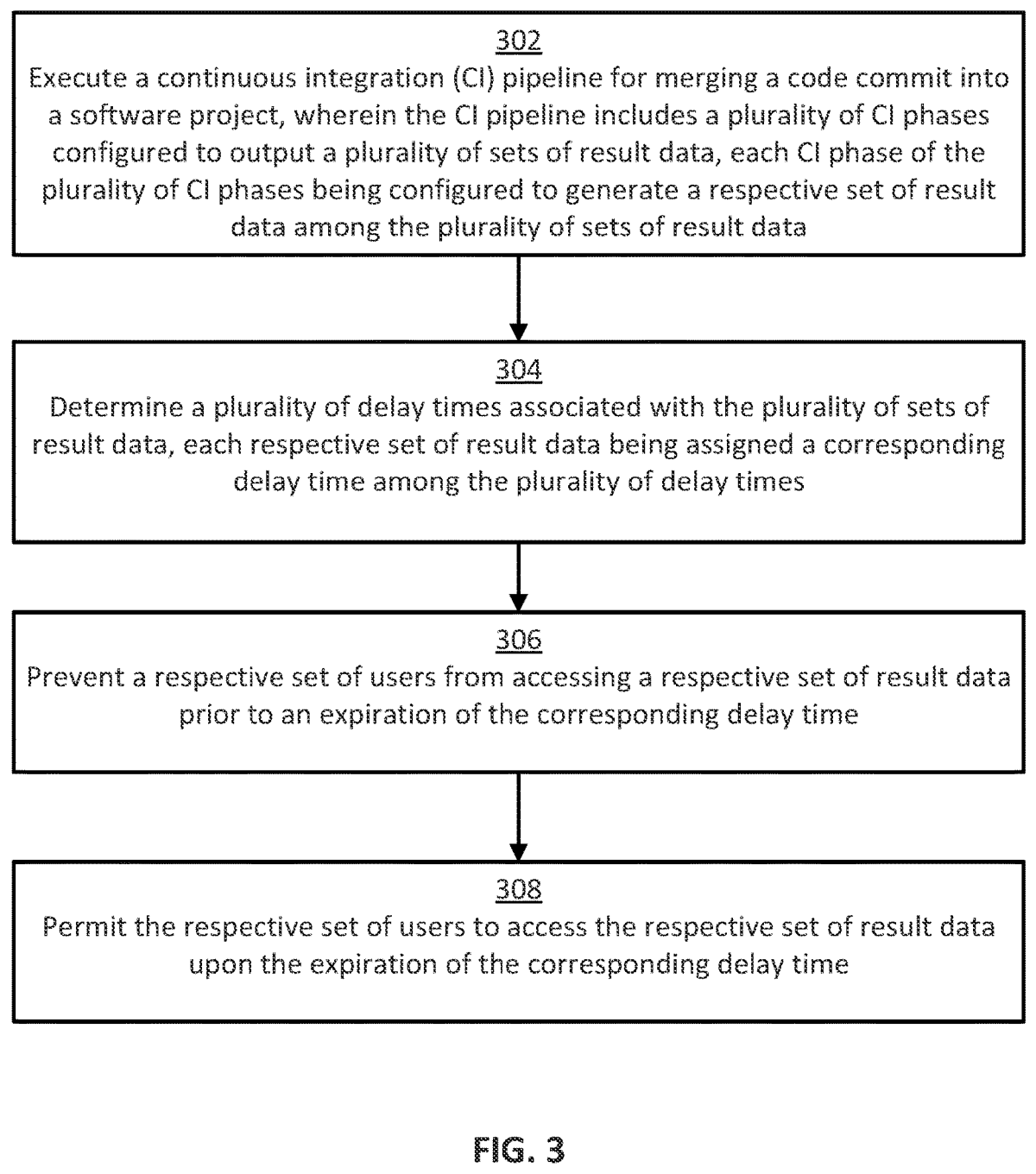

302
Execute a continuous integration (CI) pipeline for merging a code commit into a software project, wherein the CI pipeline includes a plurality of CI phases configured to output a plurality of sets of result data, each CI phase of the plurality of CI phases being configured to generate a respective set of result data among the plurality of sets of result data

304
Determine a plurality of delay times associated with the plurality of sets of result data, each respective set of result data being assigned a corresponding delay time among the plurality of delay times

306
Prevent a respective set of users from accessing a respective set of result data prior to an expiration of the corresponding delay time

308
Permit the respective set of users to access the respective set of result data upon the expiration of the corresponding delay time

FIG. 3

TIME-DELAY-BASED ACCESS CONTROL FOR CONTINUOUS INTEGRATION PIPELINES

TECHNICAL FIELD

The present disclosure relates generally to data pipelines. More specifically, but not by way of limitation, this disclosure relates to implementing delay times for controlling user access to sets of result data that have been output from a continuous integration pipeline.

BACKGROUND

Continuous integration (CI) is a software development practice in which developers merge changes made to code to a central data platform, such as a repository. A continuous integration (CI) pipeline can merge code to a software project by performing a series of steps. For example, the CI pipeline can be configured to run a sequence of builds and tests. The sequence of builds and tests can generate sets of output files, logs, software artifacts, or other result data.

BRIEF DESCRIPTION OF THE DRAWINGS

FIG. 3 is a flow chart of a process for controlling user access to sets of result data from a continuous integration pipeline based on time delays according to some aspects of the present disclosure.

DETAILED DESCRIPTION

Figure 1:
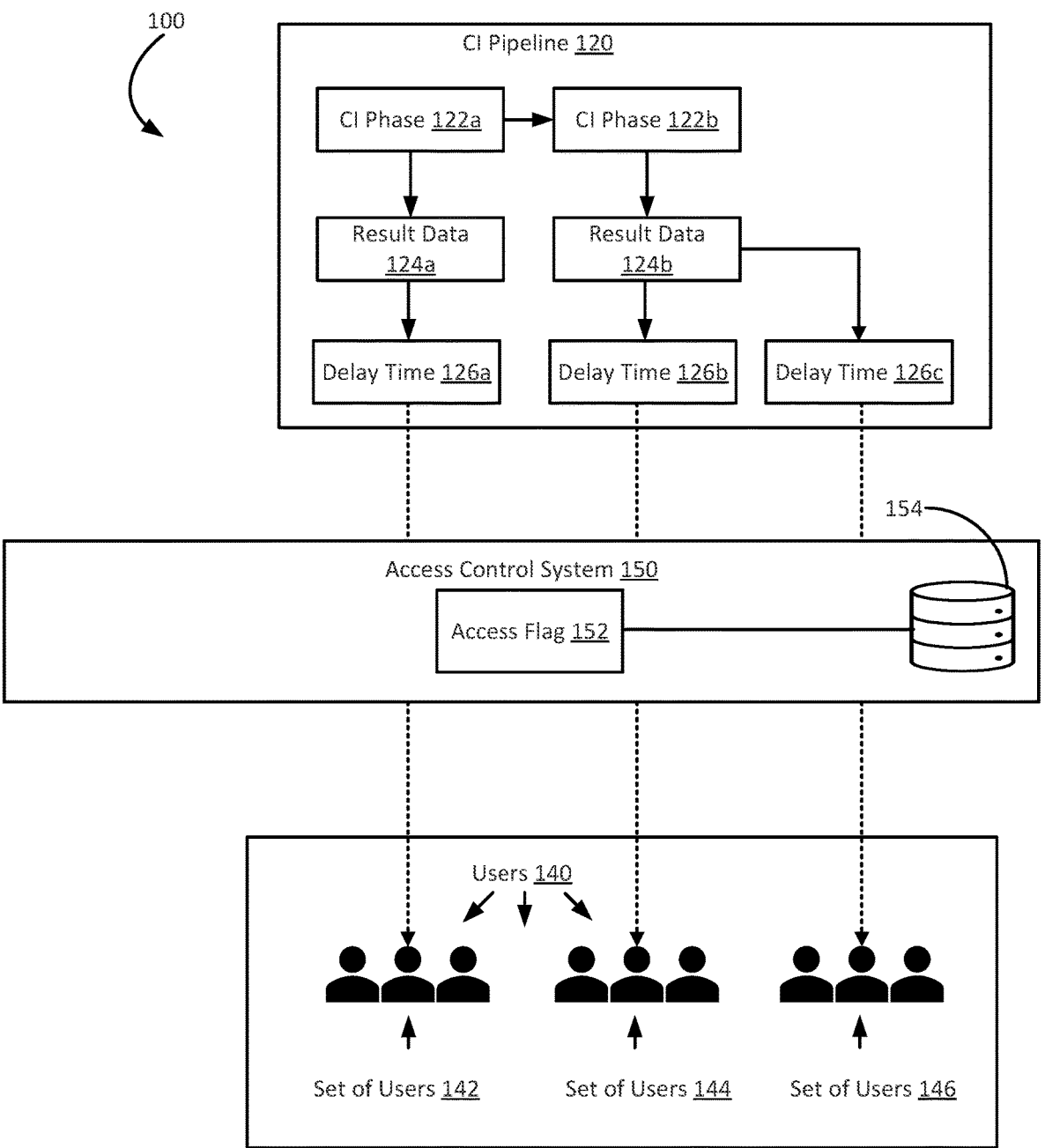
FIG. 1 is a block diagram of an example of a system that can control user access to sets of result data from a continuous integration pipeline based on time delays according to some aspects of the present disclosure.

A continuous integration (CI) pipeline can involve a series of CI phases. Each CI phase can involve executing one or more tasks. The tasks in each CI phase can generate result data when executed. For example, a CI pipeline can include a build phase and a test phase. During the build phase, elements of source code in a can be compiled and 'built' to generate one or more standalone software artifacts that can be run on a computer. The software artifacts can serve as one kind of result data generated by the CI pipeline. During the test phase, tests can be performed on the software artifacts to identify bugs and other issues. The test results can also serve as result data generated by the CI pipeline. Normally, the result data generated by the CI pipeline is immediately accessible to various sets of users. For example, developers working on the software project associated with the CI pipeline may be able to retrieve the result data for each CI phase. But, allowing certain users to view sets of result data immediately after they are generated following their respective CI phase can be problematic. For example, allowing a manager to access the result data without giving developers time to analyze the result data beforehand and may result in a suboptimal workflow that leads to unnecessary complications. As another example, allowing quality control specialists to review the result data before prematurely may waste time, waste computing resources, and lead to frustration.

Some examples of the present disclosure can overcome the aforementioned problems by controlling user access to the sets of result data from the CI pipeline based on time delays. More specifically, the CI pipeline can include an access control system that can enable different groups of users to access the sets of result data based on the time delays. Controlling user access to the sets of result data based on the time delays can prevent computers that are executing the CI pipeline from making unnecessary network calls or consuming excessive amounts of computing resources. For example, preventing quality control specialists from accessing the sets of result data for a delay time can give the developers sufficient time to analyze the result data and resolve problems in advance of the quality control specialists, thereby preventing redundancy of work, confusion, and consumption of computing resources in performing unnecessary operations on the sets of result data before certain bugs have been resolved.

In some examples, the access control system can be part of a distributed computing system that can execute the CI pipeline. For example, one computer in the computing system can execute the CI pipeline, and another computer in the computing system can control access to the results generated from the CI pipeline. The computing system can determine a set of delay times for the result data such that each set of result data corresponds to a delay time from the set of delay times. For example, one set of result data can correspond to one delay time, and another set of result data can correspond to a different delay time. The access control system can prevent sets of users from accessing sets of result data prior to expiration of the corresponding delay time for each respective set of result data. Similarly, the access control system can permit sets of users to access each set of result data once the corresponding delay time for each respective set of result data has expired. In some examples, the access control system can also assign different delay times to different sets of users to control their access to a particular set of result data. For example, the access control system can prevent a first set of users from accessing a particular set of result data until a first delay time has expired, and prevent a second set of users from accessing the same set of result data until a second delay time has expired.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 that can control user access to sets of result data from a continuous integration pipeline based on time delays according to some aspects of the present disclosure. The system 100 can be a distributed computing environment that includes multiple nodes (e.g., virtual or physical machines) in communication with one another via a network. The system 100 can execute a CI pipeline 120 for merging a code commit into a software project.

The CI pipeline 120 can include one or more CI phases 122*a-b*. Each CI phase 122*a-b* can include one or more tasks such as building source code to generate software artifacts, testing software artifacts, or any other suitable continuous integration tasks. Once executed, each CI phase 122*a-b* can generate sets of result data 124*a-b* and provide the sets of result data 124*a-b* as an output to the CI pipeline 120. For example, a first CI phase 122*a* can yield a first set of result data 124*a*. A second CI phase 122*b* can be executed subsequent to the first CI phase 122*a* and can yield a second set of result data 124*b*. The system 100 can determine delay times 126a-b that are associated with the sets of result data 124a-b. For example, an administrator or another user can input the delay times 126a-b into a configuration file, from which the system 100 can determine the delay times 126a-b. The system can then assign the delay times 126a-b to the sets of result data 124a-b. For example, the system can assign a first delay time 126a to the first set of result data 124a and a second delay time 126c to the second set of result data 124b. The first delay time 126a may be the same as, or different from, the second delay time 126c.

For each set of result data present in the sets of result data 124a-b, the access control system 150 can prevent certain users 140 from accessing the sets of result data 124a-b prior to an expiration of the corresponding delay times 126a-b. For example, the access control system 150 can prevent a set of users 142 from accessing the first set of result data 124a until the corresponding delay time 126a has expired. Similarly, the access control system 150 can prevent a different set of users 144 from accessing the second set of result data 124b until the corresponding delay time 126b has expired. The access control system 150 can permit the users 140 to access result data 124a-b when their corresponding delay times 126a-b have expired. For example, the access control system 150 can permit the set of users 142 to access the first set of result data 124a when its corresponding delay time 126a has expired. Similarly, the access control system 150 can permit the second set of users 144 to access the second set of result data 124b when its corresponding delay time 126b has expired.

In some examples, each set of result data may have multiple delay times associated therewith. For example, the system 100 can determine, for one set of result data 124b, a first delay time 126b associated with a first set of users 144 and a second delay time 126c associated with a second set of users 146. The first delay time 126b may be different from the second delay time 126c. The system 100 can determine a first set of users 144 associated with the first delay time 126b and a second set of users 146 associated with the second delay time 126c. A set of users can include one or more users. The access control system 150 can prevent the first set of users from accessing the set of result data 124a prior to an expiration of the first delay time 126b. Similarly, the access control system 150 can prevent the second set of users from accessing the set of result data 124a prior to an expiration of the second delay time 126c.

In some examples, the system 100 can, in response to determining that the first delay time 126b has elapsed, transmit one or more notifications to the first set of users 144 indicating that the first delay time 126b has elapsed. The one or more notifications can include an e-mail, an SMS message, an update to an interface object on a website, or any other suitable form of notification. Similarly, the system 100 can, in response to determining that the second delay time 126c has elapsed, transmit one or more notifications to the second set of users indicating that the second delay time 126c has elapsed. In some examples, the second delay time 126c may be dependent on another delay time, such as delay time 126a or delay time 126b. For example, the second delay time 126c may expire after a pre-defined time period following the expiration of the first delay time 126b. For instance, the second delay time 126c may expire 15 minutes after the expiration of the first delay time 126b. Causing the second delay time 126c to expire after a pre-defined time period following the expiration of the first delay time 126b can enable the first set of users 144 to access the set of result data 124a prior to the second set of users 146 for the pre-defined time period.

The access control system 150 can include a database 154 that can store one or more access flags 152 that controls access to the result data 124a-b by the users 142-146. The access control system 150 can prevent certain sets of users 140 from accessing result data by setting a corresponding access flag 152. Similarly, the access control system 150 can permit certain sets of users 140 to access result data by setting the corresponding access flag 152. For example, the access control system 150 can set the access flag 152 to a first value to permit a set of users 142 to access the set of result data 124a, or the access control system 150 can set the access flag 152 to a second value to prevent the set of users 142 from accessing the set of result data 124a.

In some examples, the access control system 150 can receive a first request to access the set of result data 124b from a first user in a first set of users 144. The access control system can receive a second request to access the set of result data 124b from a second user in the second set of users 146. Subsequent to determining that the first delay time 126b has elapsed and receiving the first request, the access control system 150 can transmit the set of result data 124b to the first user in the first set of users 144 (e.g., via a web application or another interface). Similarly, in response to determining that the second delay time 126c has elapsed, and in response to receiving the second request, the access control system 150 can transmit the set of result data 124b to the second user in the second set of users 146 (e.g., via the web application or other interface).

Figure 2:
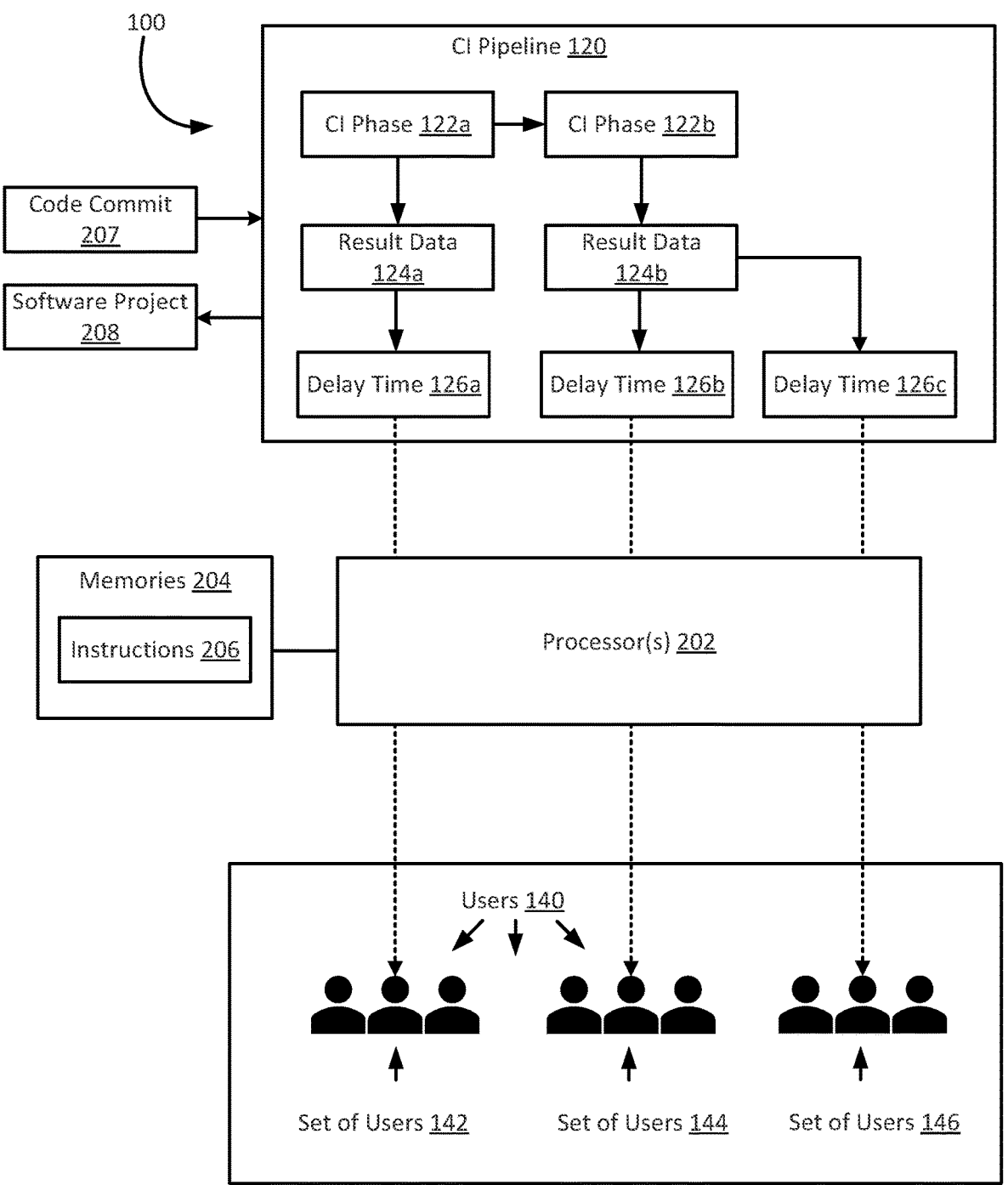
FIG. 2 is a block diagram of an example of a system that can control user access to sets of result data from a continuous integration pipeline based on time delays according to some aspects of the present disclosure.

FIG. 2 is a block diagram of an example of a system that can control user access to sets of result data from a continuous integration pipeline based on time delays according to some aspects of the present disclosure. The system can include one or more processors 202 coupled to a memory 204. The one or more processors 202 can include one processor or multiple processors. Examples of the processors 202 include a Field-Programmable Gate Array (FPGA), an application-specific integrated circuit (ASIC), or a microprocessor. The processors 202 can execute instructions 206 stored in the memories 204 to perform one or more operations. In some examples, the instructions 206 can include processor-specific instructions generated by a compiler or an interpreter from code written in any suitable computer-programming language, such as C, C++, C#, and Java.

The memories 204 can include one memory device or multiple memory devices. The memories 204 can be volatile or non-volatile, in that the memories 204 can retain stored information when powered off. Examples of the memories 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processors 202 with the instructions 206 or other program code. Non-limiting examples of a computer-readable medium include magnetic disks, memory chips, ROM, random-access memory (RAM), an ASIC, a configured processor, optical storage, or any other medium from which a computer processor can read the instructions 206.

The processors 202 can execute a continuous integration (CI) pipeline 120 for merging a code commit 207 into a software project 208. The CI pipeline 120 can include a series of sequential CI phases 122a-b. The CI phases 122a-b can each include one or more CI tasks that may generate one or more sets of result data 124a-b for each CI phase 122a-b. For example, the CI phases 122a-b can include software build processes, unit tests, performance tests, acceptance tests, or any other suitable CI tasks. The processors 202 can determine delay times 126*a-c* for the sets of result data 124*a-b*, for example by accessing a lookup table that maps delay times to certain types of result data. The lookup table may also map the delay times to certain groups of users. The processors 202 can use the delay times 126*a-c* to prevent sets of users 142-146 from accessing the sets of result data 124*a-b* prior to an expiration of their corresponding delay times 126*a-c*. The processors 202 can also permit the sets of users 142-146 to access the sets of result data 124*a-b* upon or after expiration of the corresponding delay time 126*a-c*.

In some examples, the processors 202 can determine that the delay times 126*a-c* have expired and responsively transmit one or more notifications to the users 140. For example, the processors 202 can determine that the first delay time has elapsed and transmit a first notification to a first set of users 140 indicating that the first delay time has elapsed. The processors 202 can also determine that the second delay time 126*c* has expired and transmit a second notification to the second set of users 146 indicating that the second delay time has elapsed.

In some examples, the processors 202 can determine a first delay time 126*b* and a second delay time 126*c* associated with a particular set of result data 124*a-b*. The processors 202 can identify a first set of users 144 and a second set of users 146. For example, the first set of users 144 may have a certain privilege level or may belong to a certain user group, whereas the second set of users 146 may have another privilege level or may belong to another user group. The first set of users 144 and the second set of users 146 can each include one or more users 140 and may not include the same users 140. The processors 202 can prevent the first set of users 144 from accessing the set of result data 124*b* prior to an expiration of the first delay time 126*b*, and prevent the second set of users from accessing the set of result data 124*b* prior to an expiration of the second delay time 126*c*.

In some examples, the second delay time 126*c* can be dependent on another time delay, such as the delay time 126*a* or the delay time 126*b*. For example, the second delay time 126*c* may not begin to elapse until after the first delay time 126*b* has expired, or may include some other dependency on the first delay time 126*b*.

FIG. 3 is a flow chart of a process for controlling user access to sets of result data 124*a-b* from a continuous integration pipeline based on time delays according to some aspects of the present disclosure. Other examples may include more operations, fewer operations, different operations, or a different order of operations than is shown in FIG. 3. The operations of FIG. 3 are described below with reference to the components of FIG. 2 above.

At block 302, the one or more processors 202 execute a continuous integration (CI) pipeline for merging a code commit 207 into a software project 208. The CI pipeline 120 can include CI phases 122*a-b* that can output sets of result data 124*a-b*. Each CI phase can generate a respective set of result data among the sets of result data 124*a-b*. For example, each CI phase can involve tasks, such as tests or builds, that can generate result data. The result data can include logs, software builds, test outputs, or any other suitable result data that can be generated during operations taking place in the CI phases 122*a-b*. In some examples, the result data corresponding to each CI phase can be output upon completion of each corresponding CI phase.

At block 304, the one or more processors 202 determine a set of delay times 126*a-c* associated with the sets of result data 124*a-b*, each respective set of result data being assigned a corresponding delay time among the set of delay times

126*a-c*. In some examples, the one or more processors 202 can determine multiple delay times for each set of result data. For example, one or more processors 202 can determine a first delay time 126*b* and a second delay time 126*c* such that the first delay time 126*b* is different from the second delay time 126*c*. The one or more processors 202 can determine a first set of users 144 and a second set of users 146. For example, the one or more processors 202 can classify the first set of users 144 and the second set of users 146 based on identifiers that may be present in user accounts of users in each set of users. In some examples, some delay times can depend on other delay times, or can be determined with respect to an external event. For example, the second delay time 124*c* can be dependent on the first delay time 126*b*. The second delay time can include a predefined time period following the expiration of the first delay time 126*b*.

At block 306, for each respective set of result data, the one or more processors 202 can prevent a respective set of users from accessing the respective set of result data prior to an expiration of the corresponding delay time. In some examples, an access control system can prevent each respective set of users from accessing their respective set of result data. For example, the access control system, can receive a request from a group of users to access a set of result data. The delay time corresponding to the group of users may not have expired, and a flag in the access control system may indicate that the corresponding delay time has not expired. In response to determining that the corresponding delay time has not expired, the group of users may be denied access to the set of result data. However, other users may be permitted to access the set of result data (assuming their access is not also governed by a delay time).

At block 308, for each respective set of result data, the one or more processors 202 permit the respective set of users to access the respective set of result data upon the expiration of the corresponding delay time. In some examples, the processors 202 can determine that the corresponding delay times 126*a-c* have elapsed. The processors 202 can, subsequent to determining that the corresponding delay times have elapsed, transmit one or more notifications to the users indicating that the delay times have elapsed. In some examples, the one or more notifications can be delivered by SMS, e-mail, webpage, or any other suitable method for transmitting notifications. In an illustrative example, the processors 202 can determine that a first delay time 126*b* associated with a first set of users has elapsed and responsively transmit one or more notifications to the first set of users indicating that the first delay time 126*b* has elapsed. The one or more notifications may also include status information relating to the CI pipeline 120.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:
1. A system comprising:
one or more processors; and
one or more memories including instructions that are executable by the one or more processors to:
execute a single run of a continuous integration (CI) pipeline for merging a single code commit into a software project, wherein the execution of the single run of the CI pipeline for merging the single code commit into the software project involves execution of a plurality of CI phases for processing the single code commit prior to merging the single code commit into the software project, wherein the execution of the plurality of CI phases for processing the single code commit produces a plurality of sets of result data, wherein each CI phase of the plurality of CI phases involves executing at least one task in relation to the single code commit to generate a respective set of result data among the plurality of sets of result data, and wherein at least one CI phase of the plurality of CI phases involves executing a software test in relation to the single code commit to generate test result data which is part of the plurality of sets of result data;

determine a plurality of delay times associated with the plurality of sets of result data generated by the execution of the single run of the CI pipeline for merging the single code commit into the software project, each respective set of result data being assigned a corresponding delay time among the plurality of delay times;

for each respective set of result data:

prevent, by an access control system and based on at least one flag, a respective set of users from accessing the respective set of result data prior to an expiration of the corresponding delay time; and permit, by the access control system and based on the at least one flag, the respective set of users to access the respective set of result data upon the expiration of the corresponding delay time; and for a particular set of result data among the plurality of sets of result data:

prevent a first set of users from accessing the particular set of result data prior to an expiration of a first delay time of the plurality of delay times, and prevent a second set of users from accessing the particular set of result data prior to an expiration of a second delay time of the plurality of delay times, wherein the second set of users is different from the first set of users, and wherein the second delay time is different from the first delay time; and permit the first set of users to access the particular set of result data subsequent to the expiration of the first delay time, and permit the second set of users to access the particular set of result data subsequent to the expiration of the second delay time.

2. The system of claim 1, wherein the instructions are further executable by the one or more processors for causing the one or more processors to:

determine the first delay time and the second delay time associated with the particular set of result data;

determine that the first set of users is associated with the first delay time and that the second set of users is associated with the second delay time; and based on determining that the first set of users is associated with the first delay time and that the second set of users is associated with the second delay time, apply the first delay time to the first set of users and the second delay time to the second set of users.

3. The system of claim 2, wherein the instructions are further executable by the one or more processors for causing the one or more processors to:

determine that the first delay time associated with the first set of users has elapsed and responsively transmit one or more notifications to the first set of users indicating that the first delay time has elapsed; and determine that the second delay time associated with the second set of users has elapsed and responsively transmit one or more notifications to the second set of users indicating that the second delay time has elapsed.

4. The system of claim 2, wherein the second delay time is dependent on the first delay time.

5. The system of claim 4, wherein the second delay time includes at least a predefined time period following the expiration of the first delay time.

6. The system of claim 1, wherein the instructions are further executable by the one or more processors for causing the one or more processors to:

prevent the respective set of users from accessing the respective set of result data by setting a corresponding access flag to a first value in a database; and permit the respective set of users to access the respective set of result data by setting the corresponding access flag to a second value in the database.

7. The system of claim 2, wherein the instructions are further executable by the one or more processors for causing the one or more processors to:

receive a first request to access the particular set of result data from a first user in the first set of users;

receive a second request to access the particular set of result data from a second user in the second set of users;

in response to determining that the first delay time has elapsed and receiving the first request, transmit the particular set of result data to the first user via a web application; and in response to determining that the second delay time has elapsed and receiving the second request, transmit the particular set of result data to the second user via the web application.

8. A method comprising:

executing, by one or more processors, a single run of a continuous integration (CI) pipeline for merging a single code commit into a software project, wherein the execution of the single run of the CI pipeline for merging the single code commit into the software project involves execution of a plurality of CI phases for processing the single code commit prior to merging the single code commit into the software project, wherein the execution of the plurality of CI phases for processing the single code commit produces a plurality of sets of result data, wherein each CI phase of the plurality of CI phases involves executing at least one task in relation to the single code commit to generate a respective set of result data among the plurality of sets of result data, and wherein at least one CI phase of the plurality of CI phases involves executing a software test in relation to the single code commit to generate test result data which is part of the plurality of sets of result data;

determining, by the one or more processors, a plurality of delay times associated with the plurality of sets of result data generated by the execution of the single run of the CI pipeline for merging the single code commit into the software project, each respective set of result data being assigned a corresponding delay time among the plurality of delay times;

for each respective set of result data:

preventing, by an access control system and based on at least one flag, a respective set of users from accessing the respective set of result data prior to an expiration of the corresponding delay time; and permitting, by the access control system and based on the at least one flag, the respective set of users to access the respective set of result data upon the expiration of the corresponding delay time; and for a particular set of result data among the plurality of sets of result data:

preventing a first set of users from accessing the particular set of result data prior to an expiration of a first delay time of the plurality of delay times, and preventing a second set of users from accessing the particular set of result data prior to an expiration of a second delay time of the plurality of delay times, wherein the second set of users is different from the first set of users, and wherein the second delay time is different from the first delay time; and permitting the first set of users to access the particular set of result data subsequent to the expiration of the first delay time, and permitting the second set of users to access the particular set of result data subsequent to the expiration of the second delay time.

9. The method of claim 8, further comprising:

determining, by the one or more processors, the first delay time and the second delay time associated with the particular set of result data;

determining, by the one or more processors, that the first set of users is associated with the first delay time and that the second set of users is associated with the second delay time; and based on determining that the first set of users is associated with the first delay time and that the second set of users is associated with the second delay time, apply the first delay time to the first set of users and the second delay time to the second set of users.

10. The method of claim 9, further comprising:

determining, by the one or more processors, that the first delay time associated with the first set of users has elapsed and responsively transmitting one or more notifications to the first set of users indicating that the first delay time has elapsed; and determining, by the one or more processors, that the second delay time associated with the second set of users has elapsed and responsively transmitting one or more notifications to the second set of users indicating that the second delay time has elapsed.

11. The method of claim 10, wherein the second delay time is dependent on the first delay time.

12. The method of claim 11, wherein the second delay time includes at least a predefined time period following the expiration of the first delay time.

13. The method of claim 8, further comprising:

preventing, by the one or more processors, the respective set of users from accessing the respective set of result data by setting a corresponding access flag to a first value in a database; and permitting, by the one or more processors, the respective set of users to access the respective set of result data by setting the corresponding access flag to a second value in the database.

14. The method of claim 10, further comprising:

receiving, by the one or more processors, a first request to access the particular set of result data from a first user in the first set of users;

receiving, by the one or more processors, a second request to access the particular set of result data from a second user in the second set of users;

in response to determining that the first delay time has elapsed and receiving the first request, transmitting, by the one or more processors, the particular set of result data to the first user via a web application; and in response to determining that the second delay time elapsed and receiving the second request, transmitting, by the one or more processors, the particular set of result data to the second user via the web application.

15. A non-transitory computer-readable medium comprising program code that is executable by one or more processors for causing the one or more processors to:

execute a single run of a continuous integration (CI) pipeline for merging a single code commit into a software project, wherein the execution of the single run of the CI pipeline for merging the single code commit into the software project involves execution of a plurality of CI phases for processing the single code commit prior to merging the single code commit into the software project, wherein the execution of the plurality of CI phases for processing the single code commit produces a plurality of sets of result data, wherein each CI phase of the plurality of CI phases involves executing at least one task in relation to the single code commit to generate a respective set of result data among the plurality of sets of result data, and wherein at least one CI phase of the plurality of CI phases involves executing a software test in relation to the single code commit to generate test result data which is part of the plurality of sets of result data;

determine a plurality of delay times associated with the plurality of sets of result data generated by the execution of the single run of the CI pipeline for merging the single code commit into the software project, each respective set of result data being assigned a corresponding delay time among the plurality of delay times;

for each respective set of result data:

prevent, by an access control system and based on at least one flag, a respective set of users from accessing the respective set of result data prior to an expiration of the corresponding delay time; and permit, by the access control system and based on the at least one flag, the respective set of users to access the respective set of result data upon the expiration of the corresponding delay time; and for a particular set of result data among the plurality of sets of result data:

prevent a first set of users from accessing the particular set of result data prior to an expiration of a first delay time of the plurality of delay times, and prevent a second set of users from accessing the particular set of result data prior to an expiration of a second delay time of the plurality of delay times, wherein the second set of users is different from the first set of users, and wherein the second delay time is different from the first delay time; and permit the first set of users to access the particular set of result data subsequent to the expiration of the first delay time, and permit the second set of users to access the particular set of result data subsequent to the expiration of the second delay time.

16. The non-transitory computer-readable medium of claim 15, further comprising program code that is executable by the one or more processors for causing the one or more processors to:

determine the first delay time and the second delay time associated with the particular set of result data;

determine that the first set of users is associated with the first delay time and that the second set of users is associated with the second delay time; and based on determining that the first set of users is associated with the first delay time and that the second set of users is associated with the second delay time, apply the first delay time to the first set of users and the second delay time to the second set of users.

17. The non-transitory computer-readable medium of claim 16, wherein the program code is further executable by the one or more processors for causing the one or more processors to:

determine that the first delay time associated with the first set of users has elapsed and responsively transmit one or more notifications to the first set of users indicating that the first delay time has elapsed; and determine that the second delay time associated with the second set of users has elapsed and responsively transmit one or more notifications to the second set of users indicating that the second delay time has elapsed.

18. The non-transitory computer-readable medium of claim 16, wherein the second delay time is dependent on the first delay time.

19. The non-transitory computer-readable medium of claim 18, wherein the second delay time includes at least a predefined time period following the expiration of the first delay time.

20. The non-transitory computer-readable medium of claim 15, further comprising program code that is executable by the one or more processors for causing the one or more processors to:

prevent the respective set of users from accessing the respective set of result data by setting a corresponding access flag to a first value in a database; and permit the respective set of users to access the respective set of result data by setting the corresponding access flag to a second value in the database.

* * * * *